United States Patent Office 3,314,942
Patented Apr. 18, 1967

3,314,942
3,4,5,6-TETRAHYDRO-1H-AZEPINO(4,3,2-cd)
INDOLES
Jackson B. Hester, Jr., Portage, Mich., assignor to The
Upjohn Company, Kalamazoo, Mich., a corporation of
Delaware
No Drawing. Filed Aug. 6, 1964, Ser. No. 387,994
13 Claims. (Cl. 260—239.3)

The present invention relates to novel organic compounds and is more particularly concerned with novel 3,4,5,6-tetrahydro-1H-azepino[4,3,2-cd]indoles, acid addition salts thereof, and novel intermediates useful in the preparation of the novel 3,4,5,6-tetrahydro-1H-azepino[4,3,2-cd]indoles.

The novel 3,4,5,6-tetrahydro - 1H - azepino[4,3,2-cd]indoles of the present invention can be represented by the formula:

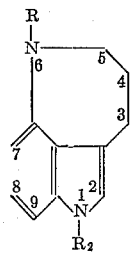

wherein R represents hydrogen,

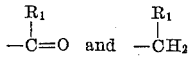

and $R_1$ represents hydrogen and alkyl of one to three carbon atoms, inclusive, e.g., methyl, ethyl, propyl, and isopropyl; $R_2$ represents hydrogen and alkyl of one to four carbon atoms, inclusive, e.g., methyl, ethyl, propyl, isopropyl, butyl, isobutyl, and the like.

The novel 3,4,5,6-tetrahydro-1H-azepino[4,3,2-cd]indole of the present invention having the formula:

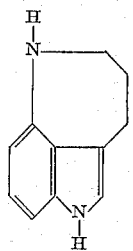

can be prepared by the following sequence of steps:

(A) Reacting 4-nitrogramine with dialkyl malonate to produce a dialkyl(4-nitroindol-3-ylmethyl)malonate having the formula:

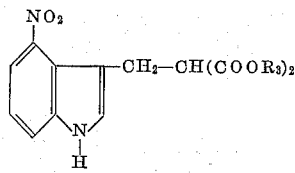

wherein $R_3$ is alkyl of one to four carbon atoms, inclusive.

The reaction is carried out in the presence of a basic condensation catalyst and an inert solvent at reaction temperatures of between about 80 and about 150° C. Inert solvents which can be employed include benzene, toluene, xylene, and the like, with benzene being preferred. Basic condensation catalysts which can be employed include sodium hydroxide, potassium hydroxide, and sodium. The sodium salt of the dialkyl malonate utilized in the reaction can also be employed as the basic condensation catalyst.

(B) Concomitantly reducing and cyclizing III using hydrogen and a hydrogenation catalyst in the presence of an inert solvent to produce a novel 5-oxo-3,4,5,6-tetrahydro-1H-azepino[4,3-cd]indole-4-carboxylic acid alkyl ester of the formula:

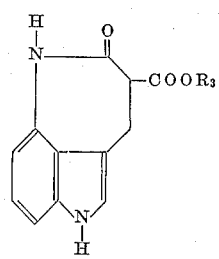

wherein $R_3$ has the above value.

The concomitant reduction and cyclization is carried out in the presence of a noble metal catalyst, e.g., platinum and palladium, or base metal catalyst, e.g., Raney nickel. For this reaction, palladium catalysts, e.g., palladium black, palladium-barium sulfate, palladium-charcoal, and the like, are generally preferred. Inert solvents suitable for the reaction include, e.g., ethyl acetate, methanol, ethanol, isopropyl alcohol, and the like. In the reaction, hydrogen pressures can range from slightly under atmospheric to about five atmospheres although higher pressures can also be used.

(C) Saponifying IV in conventional manner (e.g., with sodium hydroxide, potassium hydroxide, or lithium hydroxide in the presence of aqueous methanol, aqueous ethanol, or aqueous propanol) to produce an alkali metal salt of the novel 5-oxo-3,4,5,6-tetrahydro-1H-azepino[4,3,2-cd]indole-4-carboxylic acid of the formula:

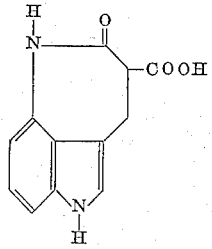

followed by acidification of the reaction mixture, e.g., with hydrochloric acid, hydrobromic acid, or sulfuric acid to obtain the free acid V.

(D) Heating the compound of Formula V, preferably under reduced pressure, at between about 155 and about 200° C., preferably about 170° C., to produce 5-oxo-3,4,5,6-tetrahydro-1H-azepino[4,3,2-cd]indole of the formula:

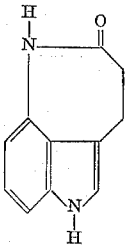

(E) Reducing the compound of Formula VI with a reducing agent, e.g., lithium aluminum hydride, lithium borohydride, and the like, with lithium aluminum hydride being preferred, to produce 3,4,5,6-tetrahydro-1H-azepino [4,3,2-cd]indole. The reduction is preferably carried out with an excess of lithium aluminum hydride in a refluxing solvent, preferably tetrahydrofuran. Other inert solvents which can be employed include diethyl ether, diisopropyl ether, N-methylmorpholine, dioxane, and the like. The reduction is carried out between about zero and about 100° C., preferably between about zero and about 65° C. when lithium aluminum hydride is employed.

The 6-alkyl-3,4,5,6-tetrahydro-1H-azepino[4,3,2-cd]indoles having the formula:

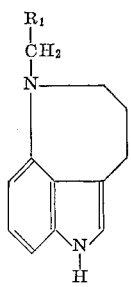

wherein $R_1$ has the value represented above, can be prepared by reacting 3,4,5,6-tetrahydro-1H-azepino[4,3,2-cd]indole with an alkanoic anhydride, e.g., formic acetic anhydride, acetic anhydride, propionic anhydride, isobutyric anhydride, and the like, or with an alkanoyl halide, e.g., acetyl chloride, acetyl bromide, propionyl chloride, butyryl chloride, and the like, to produce a 6-alkanoyl-3,4,5,6-tetrahydro-1H-azepino[4,3,2 - cd]indole having the formula:

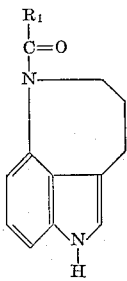

wherein $R_1$ has the value represented above, and reducing the 6-alkanoyl-3,4,5,6-tetrahydro-1H-azepino[4,3,2-cd]indole (Formula VIII) with a reducing agent, e.g., lithium aluminum hydride, lithium borohydride, and the like, with lithium aluminum hydride being preferred, under the reaction conditions set forth above for the reduction of the compound of Formula VI.

The 1-alkyl-3,4,5,6-tetrahydro-1H-azepino[4,3,2-cd]indoles having the formula:

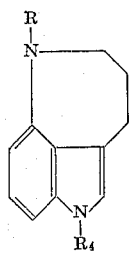

wherein R has the value represented above and $R_4$ is alkyl of one to four carbon atoms, inclusive, can be prepared by reacting 3,4,5,6-tetrahydro-1H-azepino[4,3,2-cd]indole (Formula II) or the compounds of Formulas VII or VIII with an alkyl halide or dialkyl sulfate in the presence of an inert solvent, e.g., liquid ammonia, dimethylformamide, and the like, and an alkaline condensing agent, e.g., an alkali-metal amide or alkali-metal hydride such as sodium amide, lithium amide, potassium amide, sodium hydride, and lithium hydride.

The novel compounds of the present invention have been found to possess valuable pharmacological activity in animals and mammals. Illustratively, the compounds of Formulas VI and VII as well as the 1,6-dialkyl-3,4,5,6-tetrahydro-1H-azepino[4,3,2-cd]indoles exhibit sedative and anti-inflammatory activity. When used in therapy, these novel compounds can be combined with solid or liquid pharmaceutical carriers and formulated in the form of tablets, powder packets or capsules, using starch and like excipients, or dissolved or suspended in suitable solvents or vehicles, for oral or parenteral administration.

The novel acid addition salts of the present invention can be prepared by reacting a secondary or tertiary amine of Formula I

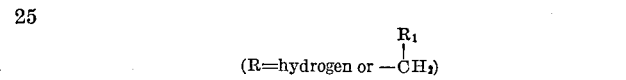

with a stoichiometric quantity of an acid, e.g., hydrochloric, hydrobromic, sulfuric, acetic, tartaric, citric, or the like. The acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The aforesaid secondary and tertiary amines can be reacted with fluosilicic acid to form amine fluosilicate salts useful as mothproofing agents according to U.S. Patents 1,915,334 and 2,075,359. These amines also form salts with thiocyanic acid, which salts can be condensed with formaldehyde according to U.S. Patents 2,425,320 and 2,606,155 to form amine thiocyanate-formaldehyde condensation products useful as pickling inhibitors.

The following examples are illustrative of the process and products of the present invention, but are not to be construed as limiting.

EXAMPLE 1

*6-methyl-3,4,5,6-tetrahydro-1H-azepino[4,3,2-cd]indole*

A. *Diethyl (4-nitroindol-3-ylmethyl)malonate.*—A vigorous stream of nitrogen was bubbled through a refluxing mixture of 100 g. (0.457 mole) of 4-nitrogramine (Berti et al., Gazz. chim. ital. 90, 525, 1960), 72 ml. (0.474 mole) of diethyl malonate, 4 l. of dry benzene, and 5 g. of powdered sodium hydroxide for 11.3 hours. The resulting dark mixture was allowed to stand for 18 hours at about 25° C. and was then filtered. The solid was washed with ether and the combined filtrate and washings were concentrated to dryness under reduced pressure. A solution of the residue in ethyl acetate was crystallized to yield two crops of diethyl (4-nitroindol-3-ylmethyl)malonate which totaled 98.45 g. and melted between 109–111.5° C. An analytical sample prepared by recrystallizing from a mixture of ethyl acetate and Skellysolve B (mixed hexanes) melted between 109–111° C.

*Analysis.*—Calcd. for $C_{16}H_{18}N_2O_6$: C, 57.48; H, 5.43; N, 8.38. Found: C, 57.61; H, 5.38; N, 8.20.

In the same manner as shown above, dimethyl (4-nitroindol - 3 - ylmethyl)malonate, dipropyl (4-nitroindol-3- ylmethyl)malonate, and dibutyl (4-nitroindol-3-ylmethyl) malonate are prepared by substituting dimethyl malonate, dipropyl malonate, and dibutyl malonate, respectively, for diethyl malonate.

B. *4-carbethoxy-5-oxo-3,4,5,6-tetrahydro-1H-azepino[4, 3,2-cd]indole.*—A mixture of the diethyl ester of Part A (10 g.; 29.9 mmoles), 10% palladium-on-charcoal catalyst (2 g.), and 95% ethanol (300 ml.) was hydrogenated in a Parr apparatus at an intial hydrogen pressure of 46 p.s.i. After about 30 minutes, the reduction was complete and the catalyst was removed by filtration through diatomaceous earth. The combined filtrate from five identical runs was concentrated under reduced pressure. Chromatography of the residue of four pounds of neutral alumina with 50% ether-chloroform and 100% chloroform yielded a crystalline product which was recrystallized from ethanol to yield 15.83 g. (41%) of 4-carbethoxy-5-oxo-3,4, 5,6-tetrahydro-1H-azepino[4,3,2-cd]indole which melted between 211–213.5° C. A sample was recrystallized three times from methanol and melted between 211.5–213.5° C.

*Analysis.*—Calcd. for $C_{14}H_{14}N_2O_3$: C, 65.10; H, 5.46; N, 10.85. Found: C, 65.22; H, 5.75; N, 10.83.

C. *5-oxo-3,4,5,6-tetrahydro-1H-azepino[4,3,2-cd]indole-4-carboxylic acid.*—A mixture of the ester of Part B (16.74 g.; 64.9 mmoles), 0.433 N aqueous potassium hydroxide (150 ml.; 65 mmoles), and ethanol (850 ml.) was refluxed under nitrogen for six hours, allowed to stand for 18 hours at 25° C., and then concentrated to dryness under reduced pressure. An aqueous solution of the residue was cooled in an ice bath and acidified with hydrochloric acid. The solid which precipitated was collected by filtration, washed with water, and dried under reduced pressure at 30° C. to yield 15.72 g. of crude 5 - oxo - 3,4,5-tetrahydro-1H-azepino[4,3,2-cd]indole-4-carboxylic acid which melted between 143–148° C. (dec.).

D. *5 - oxo - 3,4,5,6-tetrahydro-1H-azepino[4,3,2-cd]indole.*—The acid of Part C (15.72 g.) was heated in an evacuated flask at about 170° C. and 17 mm. of mercury pressure for 30 minutes. During the reaction, the solid acid slowly decarboxylated to yield a solid product. This was recrystallized from ethanol to yield 10.81 g. of 5-oxo-3,4,5,6-tetrahydro-1H-azepino[4,3,2-cd]indole which melted between 213–214° C. A sample was recrystallized three times from ethanol and melted between 214–216° C.

*Analysis.*—Calcd. for $C_{11}H_{10}N_2O$: C, 70.95; H, 5.41; N, 15.05. Found: C, 70.83; H, 5.32; N, 14.85.

E. *3,4,5,6 - tetrahydro-1H-azepino[4,3,2-cd]indole.*—To a stirred, ice-cold suspension of 7 g. of lithium aluminum hydride in 700 ml. of dry tetrahydrofuran was added, under nitrogen, 7 g. (37.6 mmoles) of 5-oxo-3,4,5,6-tetrahydro-1H-azepino[4,3,2-cd]indole. The resulting mixture was refluxed for six hours, allowed to stand at 25° C. for 18 hours and then treated successively with 7 ml. of water, 7 ml. of 15% aqueous sodium hydroxide solution, and 21 ml. of water. The inorganic precipitate was collected by vacuum filtration and washed with ether. The combined filtrate and washings were concentrated to obtain a solid. The latter was recrystallized from ethyl acetate-Skellysolve B to yield 3.41 g. (52.7%) of 3,4,5,6-tetrahydro-1H-azepino[4,3,2-cd]indole which melted between 119–121.5° C. An ether solution of this compound was decolorized with activated charcoal, filtered, and cooled to cause crystallization. The solid was recrystallized from ether to obtain 3,4,5,6-tetrahydro-1H-azepino[4,3,2-cd]indole which melted between 119–120° C. The ultraviolet spectrum (in 95% ethanol) had $\lambda_{max.}$ 230 and 296 m$\mu$ (E=31,750 and 8,750, respectively) with inflections at 288 and 302 m$\mu$ (E=8,350 and 8,600, respectively).

*Analysis.*—Calcd. for $C_{11}H_{12}N_2$: C, 76.71; H, 7.02; N, 16.27. Found: C, 77.11; H, 7.22; N, 16.43.

F. *6-formyl-3,4,5,6-tetrahydro-1H-azepino[4,3,2-cd]indole.*—Formic acetic anhydride was prepared by allowing a mixture of 97% formic acid (3.98 ml.) and acetic anhydride (9.45 ml.) to stand at 25° C. for an hour. To 10 ml. of this reagent, cooled in an ice bath, was added 2.50 g. (14.5 mmoles) of 3,4,5,6-tetrahydro-1H-azepino [4,3,2-cd]indole. Solid material rapidly crystallized from the solution. The resulting mixture was allowed to stand at 25° C. for 24 hours, and was then poured into ice water. The solid was collected by filtration, washed with water, and dried under reduced pressure at 30° C. The dried product was recrystallized from ethyl acetate to yield 2.67 g. (92.2%) of 6-formyl-3,4,5,6-tetrahydro-1H-azepino[4,3,2-cd]indole which melted between 190.5–193° C. A sample was recrystallized from ethyl acetate and melted between 192–193° C. The ultraviolet spectrum (in 95% ethanol) had $\lambda_{max.}$ 226 and 296 m$\mu$ (E=37,550 and 9,650, respectively) with an inflection at 288 m$\mu$ (E=8,700).

*Analysis.*—Calcd. for $C_{12}H_{12}N_2O$: C, 71.98; H, 6.04; N, 13.99. Found: C, 71.79; H, 6.19; N, 13.57.

G. *6-methyl-3,4,5,6 - tetrahydro - 1H-azepino[4,3,2-cd] indole.*—To an ice-cold suspension of 2.5 g. of lithium aluminum hydride in 260 ml. of dry tetrahydrofuran was added 2.48 g. (12.4 mmoles) of 6-formyl-3,4,5,6-tetrahydro-1H-azepino[4,3,2-cd]indole. The resulting mixture was refluxed under nitrogen for 10 hours, cooled in an ice-bath, and treated successively with 2.5 ml. of water, 2.5 ml. of 15% aqueous sodium hydroxide solution, and 7.5 ml.. of water. The resulting mixture was stirred in the ice bath for about an hour. The solid was collected by filtration and washed several times with ether. Concentration of the combined filtrate and washings yielded a solid which was dissolved in ether. The solution was decolorized with activated charcoal, filtered, and cooled to cause crystallization. The solid was recrystallized from ether-Skellysolve B to yield 2.05 g. (88.7%) of 6-methyl-3,4,5,6-tetrahydro - 1H-azepino[4,3,2-cd]indole which melted between 98–99.5° C. An analytical sample prepared by recrystallization from ether-Skellysolve B melted between 98.5–100.5° C.

*Analysis.*—Calcd. for $C_{12}H_{14}N_2$: C, 77.38; H, 7.58; N, 15.04. Found: C, 77.70; H, 7.69; N, 14.92.

EXAMPLE 2

*6-acetyl-3,4,5,6-tetrahydro-1H-azepino[4,3,2-cd]indole*

A mixture of 3,4,5,6-tetrahydro-1H-azepino[4,3,2-cd] indole (1.19 g.; 6.88 mmoles) and acetic anhydride (15 ml.) was allowed to stand under nitrogen for 18 hours and then poured into water. The resulting solid product was collected by filitration, washed with water, and dried under reduced pressure at 35° C. A solution of this material in ethyl acetate was decolorized with activated charcoal, filtered, and crystallized to yield 1.06 g. (72%) of 6-acetyl-3,4,5,6-tetrahydro-1H-azepino[4,3,2-cd]indole which melted between 196–197.5° C. An analytical sample prepared by recrystallization from methanol-ethyl acetate melted between 197–199° C. The ultraviolet spectrum (in 95% ethanol) had $\lambda_{max.}$ 228 and 294 m$\mu$ (E=38,700 and 8,450, respectively) with an inflection at 285 m$\mu$ (E=7,750).

*Analysis.*—Calcd. for $C_{13}H_{14}N_2O$: C, 72.87; H, 6.59; N, 13.08. Found: C, 72.73; H, 6.33; N, 13.14.

In the same manner as shown above, 6-propionyl-3,4,5,6-tetrahydro - 1H - azepino[4,3,2 - cd]indole and 6-butyryl-3,4,5,6-tetrahydro-1H-azepino[4,3,2-cd]indole are prepared by substituting propionic anhydride and butyric anhydride for acetic anhydride.

EXAMPLE 3

*6-acetyl-1-methyl-3,4,5,6-tetrahydro-1H-azepino [4,3,2-cd]indole*

To a stirred solution of 3,4,5,6-tetrahydro-1H-azepino [4,3,2-cd]indole (3.0 g.; 17.4 mmoles) in dry dimethylformamide (90 ml.), under nitrogen, was added a 53.4% suspension of sodium hydride in mineral oil (1.02 g., containing 22.6 mmoles of sodium hydride). The resulting mixture was stirred at 25° C. for one hour, cooled in an ice bath, treated during ten minutes with methyl iodide (3.20 g.; 22.6 mmoles), and then allowed to rise to 25° C. After standing for 20 hours, the reaction mixture was poured into ice water (600 ml.) and extracted with ether. The ether extracts were washed with water and brine, dried over anhydrous magnesium sulfate, and concentrated under reduced pressure to produce 1-methyl-3,4,5,6-tetrahydro-1H-azepino[4,3,2-cd]indole.

A solution of 1-methyl-3,4,5,6-tetrahydro-1H-azepino [4,3,2-cd]indole in acetic anhydride (30 ml.) was allowed to stand at 25° C. under nitrogen for 18 hours. The mixture was poured into water and the product was then extracted with ether. The ether extracts were washed with water and brine, dried over anhydrous magnesium sulfate, and concentrated under reduced pressure. Chromatography of the residual oil on silica gel (300 g.) with ethyl acetate resulted in a solid which was recrystallized from ethyl acetate-Skellysolve B to yield 2.0 g. of 6-acetyl-1-methyl-3,4,5,6-tetrahydro-1H-azepino[4,3,2-cd]indole which melted between 89–90° C. The ultraviolet spectrum (in 95% ethanol) had $\lambda_{max.}$ 231 and 303 m$\mu$ (E=35,950 and 7,850, respectively) with an inflection at 280 m$\mu$ (E=5,150).

*Analysis.*—Calcd. for $C_{14}H_{16}N_2O$: C, 73.65; H, 7.07; N, 12.27. Found: C, 73.63; H, 7.16; N, 12.35.

In the same manner as shown above, 6-formyl-1-methyl-3,4,5,6-tetrahydro-1H-azepino[4,3,2-cd]indole, 6-formyl-1-ethyl-3,4,5,6-tetrahydro-1H-azepino[4,3,2-cd]indole, 6-propionyl-1-propyl-3,4,5,6-tetrahydro-1H-azepino[4,3,2-cd]indole, 6-butyryl-1-butyl-3,4,5,6-tetrahydro-1H-azepino[4,3,2-cd]indole, 6-propionyl-1-butyl-3,4,5,6-tetrahydro-1H-azepino[4,3,2-cd]indole, and 6-butyryl-1-propyl-3,4,5,6-tetrahydro-1H-azepino[4,3,2-cd]indole are prepared by substituting methyl iodide and formic acetic anhydride; ethyl iodide and formic acetic anhydride; propyl iodide and propionic anhydride; butyl iodide and butyric anhydride; butyl iodide and propionic anhydride; and propyl iodide and butyric anhydride, respectively, for acetic anhydride and methyl iodide.

EXAMPLE 4

*6-ethyl-3,4,5,6-tetrahydro-1H-azepino[4,3,2-cd]indole*

In the same manner as shown in Example 1, Part G, 6-ethyl-3,4,5,6-tetrahydro-1H-azepino[4,3,2-cd]indole was prepared by substituting 6-acetyl-3,4,5,6-tetrahydro-1H-azepino[4,3,2-cd]indole for 6-formyl-3,4,5,6-tetrahydro-1H-azepino[4,3,2-cd]indole.

Similarly, 6-propyl-3,4,5,6-tetrahydro-1H-azepino[4,3,2-cd]indole and 6-butyl-3,4,5,6-tetrahydro-1H-azepino [4,3,2-cd]indole are prepared by substituting 6-propionyl-3,4,5,6-tetrahydro-1H-azepino[4,3,2-cd]indole and 6-butyryl-3,4,5,6-tetrahydro-1H-azepino[4,3,2-cd]indole for 6-formyl-3,4,5,6-tetrahydro-1H-azepino[4,3,2-cd]indole in Example 1, Part G.

EXAMPLE 5

*6-ethyl-1-methyl-3,4,5,6-tetrahydro-1H-azepino [4,3,2-cd]indole*

In the same manner as shown in Example 1, Part G, 6-ethyl-1-methyl-3,4,5,6-tetrahydro-1H-azepino[4,3,2-cd] indole was prepared by substituting 6-acetyl-1-methyl-3,4,5,6-tetrahydro-1H-azepino[4,3,2-cd]indole for 6-formyl-3,4,5,6-tetrahydro-1H-azepino[4,3,2-cd]indole.

Similarly, 1,6-dimethyl-3,4,5,6-tetrahydro-1H-azepino [4,3,2-cd]indole, 6-methyl-1-ethyl-3,4,5,6-tetrahydro-1H-azepino[4,3,2-cd]indole, 1,6-dipropyl-3,4,5,6-tetrahydro-1H-azepino[4,3,2-cd]indole, 1,6-dibutyl-3,4,5,6-tetrahydro-1H-azepino[4,3,2-cd]indole, 6-propyl-1-butyl-3,4,5,6-tetrahydro-1H-azepino[4,3,2-cd]indole, and 6-butyl-1-propyl-3,4,5,6-tetrahydro-1H-azepino[4,3,2-cd]indole are prepared by substituting 6-formyl-1-methyl-3,4,5,6-tetrahydro-1H-azepino[4,3,2-cd]indole, 6-formyl-1-ethyl-3,4, 5,6-tetrahydro-1H-azepino[4,3,2-cd]indole, 6-propionyl-1-propyl-3,4,5,6-tetrahydro-1H-azepino[4,3,2-cd]indole, 6-butyryl-1-butyl-3,4,5,6-tetrahydro-1H-azepino[4,3,2-cd]indole, 6-propionyl-1-butyl-3,4,5,6-tetrahydro-1H-azepino[4,3,2-cd]indole, and 6-butyryl-1-propyl-3,4,5,6-tetrahydro-1H-azepino[4,3,2-cd]indole, respectively, for 6-formyl-3,4,5,6-tetrahydro-1H-azepino[4,3,2-cd]indole in Example 1, Part G.

EXAMPLE 6

*6-methyl-3,4,5,6-tetrahydro-1H-azepino[4,3,2-cd]indole hydrochloride*

An ether solution of 6-methyl-3,4,5,6-tetrahydro-1H-azepino[4,3,2-cd]indole was reacted with ethanolic hydrogen chloride to produce 6-methyl-3,4,5,6-tetrahydro-1H-azepino[4,3,2-cd]indole hydrochloride.

Similarly, 6-ethyl-3,4,5,6-tetrahydro-1H-azepino[4,3,2-cd]indole hydrobromide, 6-propyl-3,4,5,6-tetrahydro-1H-azepino[4,3,2-cd]indole acetate, and 6-butyl-3,4,5,6-tetrahydro-1H-azepino[4,3,2-cd]indole citrate are prepared by reacting 6-ethyl-3,4,5,6-tetrahydro-1H-azepino[4,3,2-cd] indole and hydrogen bromide; 6-propyl-3,4,5,6-tetrahydro-1H-azepino[4,3,2-cd]indole and acetic acid; and 6-butyl-3,4,5,6-tetrahydro-1H-azepino[4,3,2-cd]indole and citric acid.

EXAMPLE 7

*6-ethyl-1-methyl-3,4,5,6-tetrahydro-1H-azepino [4,3,2-cd]indole hydrochloride*

An ether solution of 6-ethyl-1-methyl-3,4,5,6-tetrahydro-1H-azepino[4,3,2-cd]indole was reacted with ethanolic hydrogen chloride to produce 6-ethyl-1-methyl-3,4,5,6-tetrahydro-1H-azepino[4,3,2-cd]indole hydrochloride.

Similarly, 1,6-dimethyl-3,4,5,6-tetrahydro-1H-azepino [4,3,2-cd]indole tartrate, 6-methyl-1-ethyl-3,4,5,6-tetrahydro-1H-azepino[4,3,2-cd]indole hydrobromide, 1,6-dipropyl-3,4,5,6-tetrahydro-1H-azepino[4,3,2-cd]indole acetate, 1,6-dibutyl-3,4,5,6-tetrahydro-1H-azepino[4,3,2-cd] indole citrate, 6-propyl-1-butyl-3,4,5,6-tetrahydro-1H-azepino[4,3,2-cd]indole sulfate, and 6-butyl-1-propyl-3,4,5,6-tetrahydro-1H-azepino[4,3,2-cd]indole hydrochloride are prepared by reacting 1,6-dimethyl-3,4,5,6-tetrahydro-1H-azepino[4,3,2-cd]indole and tartaric acid; 6-methyl-1-ethyl-3,4,5,6-tetrahydro-1H-azepino[4,3,2-cd] indole and hydrogen bromide; 1,6-dipropyl-3,4,5,6-tetrahydro-1H-azepino[4,3,2-cd]indole and acetic acid; 1,6-dibutyl-3,4,5,6-tetrahydro-1H-azepino[4,3,2-cd]indole and citric acid; 6-propyl-1-butyl-3,4,5,6-tetrahydro-1H-azepino[4,3,2-cd]indole and sulfuric acid; and 6-butyl-1-propyl-3,4,5,6-tetrahydro-1H-azepino[4,3,2-cd]indole and hydrogen chloride.

I claim:
1. A compound selected from the group consisting of (1) 3,4,5,6-tetrahydro-1H-azepino[4,3,2-cd]indoles having the formula:

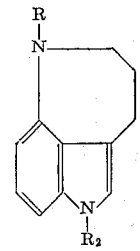

wherein R is selected from the group consisting of hydrogen,

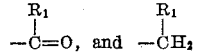

wherein $R_1$ is selected from the group consisting of hydrogen and alkyl of one to three carbon atoms, inclusive, $R_2$ is selected from the group consisting of hydrogen and alkyl of one to four carbon atoms, inclusive, and (2) acid addition salts thereof.

2. A 6-alkyl-3,4,5,6-tetrahydro-1H-azepino[4,3,2-cd]indole having the formula:

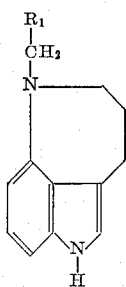

wherein $R_1$ is selected from the group consisting of hydrogen and alkyl of one to three carbon atoms, inclusive.

3. A 6-alkanoyl-3,4,5,6-tetrahydro-1H-azepino[4,3,2-cd]indole having the formula:

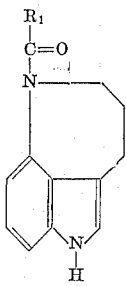

wherein $R_1$ is selected from the group consisting of hydrogen and alkyl of one to three carbon atoms, inclusive.

4. A 5-oxo-3,4,5,6-tetrahydro-1H-azepino[4,3,2-cd]indole-4-carboxylic acid alkyl ester having the formula:

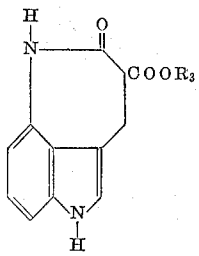

wherein $R_3$ is alkyl of one to four carbon atoms, inclusive.

5. 4-carbethoxy-5-oxo-3,4,5,6-tetrahydro-1H-azepino[4,3,2-cd]indole.

6. 5-oxo-3,4,5,6-tetrahydro-1H-azepino[4,3,2-cd]indole-4-carboxylic acid.

7. 5-oxo-3,4,5,6-tetrahydro-1H-azepino[4,3,2-cd]indole.

8. 3,4,5,6-tetrahydro-1H-azepino[4,3,2-cd]indole.

9. 6-formyl-3,4,5,6-tetrahydro-1H-azepino[4,3,2-cd]indole.

10. 6-methyl-3,4,5,6-tetrahydro-1H-azepino[4,3,2-cd]indole.

11. 6-acetyl-3,4,5,6-tetrahydro-1H-azepino[4,3,2-cd]indole.

12. 6-acetyl-1-methyl-3,4,5,6-tetrahydro-1H-azepino[4,3,2-cd]indole.

13. 1-methyl-3,4,5,6-tetrahydro-1H-azepino[4,3,2-cd]indole.

No references cited.

ALEX MAZEL, *Primary Examiner.*

JOSE TOVAR, *Assistant Examiner.*